(12) United States Patent
Ohmi et al.

(10) Patent No.: US 6,273,139 B1
(45) Date of Patent: Aug. 14, 2001

(54) FLUID CONTROL APPARATUS

(75) Inventors: Tadahiro Ohmi, Sendai; Michio Yamaji, Osaka; Naoya Masuda, Osaka; Takashi Hirose, Osaka; Kosuke Yokoyama, Osaka; Nobukazu Ikeda, Osaka, all of (JP)

(73) Assignee: Fujikin, Inc., Osaka (JP)

( * ) Notice: Subject to any disclaimer, the term of this patent is extended or adjusted under 35 U.S.C. 154(b) by 0 days.

(21) Appl. No.: 09/168,858

(22) Filed: Oct. 9, 1998

(30) Foreign Application Priority Data

Oct. 13, 1997 (JP) .................................................. 9-278495

(51) Int. Cl.[7] ...................................................... F16K 1/00
(52) U.S. Cl. ............................................ 137/884; 251/367
(58) Field of Search ........................ 251/367; 137/487.5, 137/551, 884, 597

(56) References Cited

U.S. PATENT DOCUMENTS

| | | | |
|---|---|---|---|
| 3,654,960 | * | 4/1972 | Kiernan ................................ 137/608 |
| 3,831,951 | * | 8/1974 | Patel et al. ........................... 285/379 |
| 4,168,724 | * | 9/1979 | Graffunder et al. ............. 137/884 X |
| 4,257,439 | * | 3/1981 | Mayeaux .................................. 137/88 |
| 4,930,401 | * | 6/1990 | Cameron et al. ................. 137/884 X |
| 5,368,062 | * | 11/1994 | Okumura et al. ..................... 137/597 |
| 5,720,317 | * | 2/1998 | Nimberger ............................ 137/597 |
| 5,819,782 | * | 10/1998 | Itafuji .................................... 137/884 |
| 5,983,933 | * | 11/1999 | Ohmi et al. ........................... 137/597 |
| 5,992,463 | * | 11/1999 | Redemann et al. ................... 137/884 |
| 6,012,479 | * | 1/2000 | Fukushima et al. ............. 137/884 X |

* cited by examiner

Primary Examiner—Kevin Shaver
Assistant Examiner—John Bastianelli
(74) Attorney, Agent, or Firm—Armstrong, Westerman, Hattori, McLeland, & Naughton, LLP

(57) ABSTRACT

A fluid control apparatus having a plurality of fluid control members each further having, a blocklike body with an upper side and a lower side, at least one monofunctional member for controlling fluid mounted on the upper side of the blocklike body, and at least one fluid channel formed between the monofunctional member for controlling fluid and the bottom side of the blocklike body; a plurality of couplings each further having, a blocklike body mounted to the bottom surface of at least one fluid control member, at least one communication channel for fluids communicating between at least two fluid channels of at least two different fluid control members; and a base plate for supporting a plurality of couplings. Each of the plurality of fluid control members is mounted to each of the plurality of couplings so as to be individually removable therefrom.

5 Claims, 4 Drawing Sheets

FLUID CONTROL APPARATUS

BACKGROUND OF THE INVENTION

The present invention relates to fluid control apparatus, for example, for use in semiconductor manufacturing equipment.

The terms "upper" and "lower" as used herein refer respectively to the upper and lower sides of FIG. 1. However, these terms are used for the sake of convenience; the apparatus to be described can be used as turned upside down or as laid on its side.

It is required in recent years that the fluid control apparatus for use in semiconductor manufacturing equipment be installable in a diminished space and have channels of reduced volume. To fulfill this requirement, JP-A No. 172265/1993 proposes a unit of at least three monofunctional members (such as a filter, massflow controller and on-off valve) which are directly connected together (integrated).

In addition to the above requirement, a decrease in the number of components, ease of maintenance and reduced pressure losses are also required of the fluid control apparatus for use in semiconductor manufacturing equipment. No fluid control apparatus meeting these requirements are known at present.

SUMMARY OF THE INVENTION

An object of the present invention is to provide a fluid control apparatus which fulfills all the requirements of integration, reduction in the number of components and facilitated maintenance.

Another object of the invention is to provide a fluid control apparatus which further fulfills the requirement of reduced pressure losses.

The present invention provides a fluid control apparatus comprising a plurality of fluid control members arranged at an upper level and a plurality of couplings arranged at a lower level, at least one of the fluid control members comprising a plurality of monofunctional members integrally provided on a blocklike body, the blocklike body being mounted on at least one of the couplings so as to be removable upward.

Examples of monofunctional members are on-off valves, pressure regulators, filters, pressure sensors, etc. The fluid control member is, for example, a unit of two or three on-off valves as mounted on a blocklike body, or a unit of a pressure regulator and a pressure sensor which are mounted on a blocklike body.

With the fluid control apparatus of the invention, a plurality of monofunctional members are integrally provided on a blocklike body. This reduces the number of components such as blocklike bodies and seal members. When there arises a need to replace one of the plurality of monofunctional members, the fluid control member is removed upward from the apparatus, and the particular monofunctional member is then replaced, hence facilitated maintenance. It is desired that monofunctional members which require replacement less frequently be integrally provided on a single blocklike body as a fluid control member, and that monofunctional members which are to be replaced frequently be used singly as individual fluid control members. Both the reduction in the number of components and ease of maintenance can then be attained readily.

Preferably, at least one of the couplings which causes one of the fluid control members to communicate with the fluid control member adjacent thereto is a blocklike coupling having a V-shaped communication channel. The two adjacent fluid control members can then be held in communication with each other by the single coupling. This results in a further reduction in the number of components.

Preferably, at least one of the couplings which causes one of the fluid control members to communicate with the fluid control member adjacent thereto comprises two blocklike components butting against each other to form a U-shaped communication channel. In the case of V-shaped communication channels, the cross sectional area of the channel is smaller than the area of the opening thereof by an amount attributable to the inclination of the channel, whereas the cross sectional area of the U-shaped channel can be the same as the opening area thereof. The U-shaped channel can therefore be given a greater diameter than the V-shaped channel, consequently reducing the pressure loss involved in the fluid control apparatus.

DESCRIPTION OF THE PREFERRED EMBODIMENTS

Figure 1:
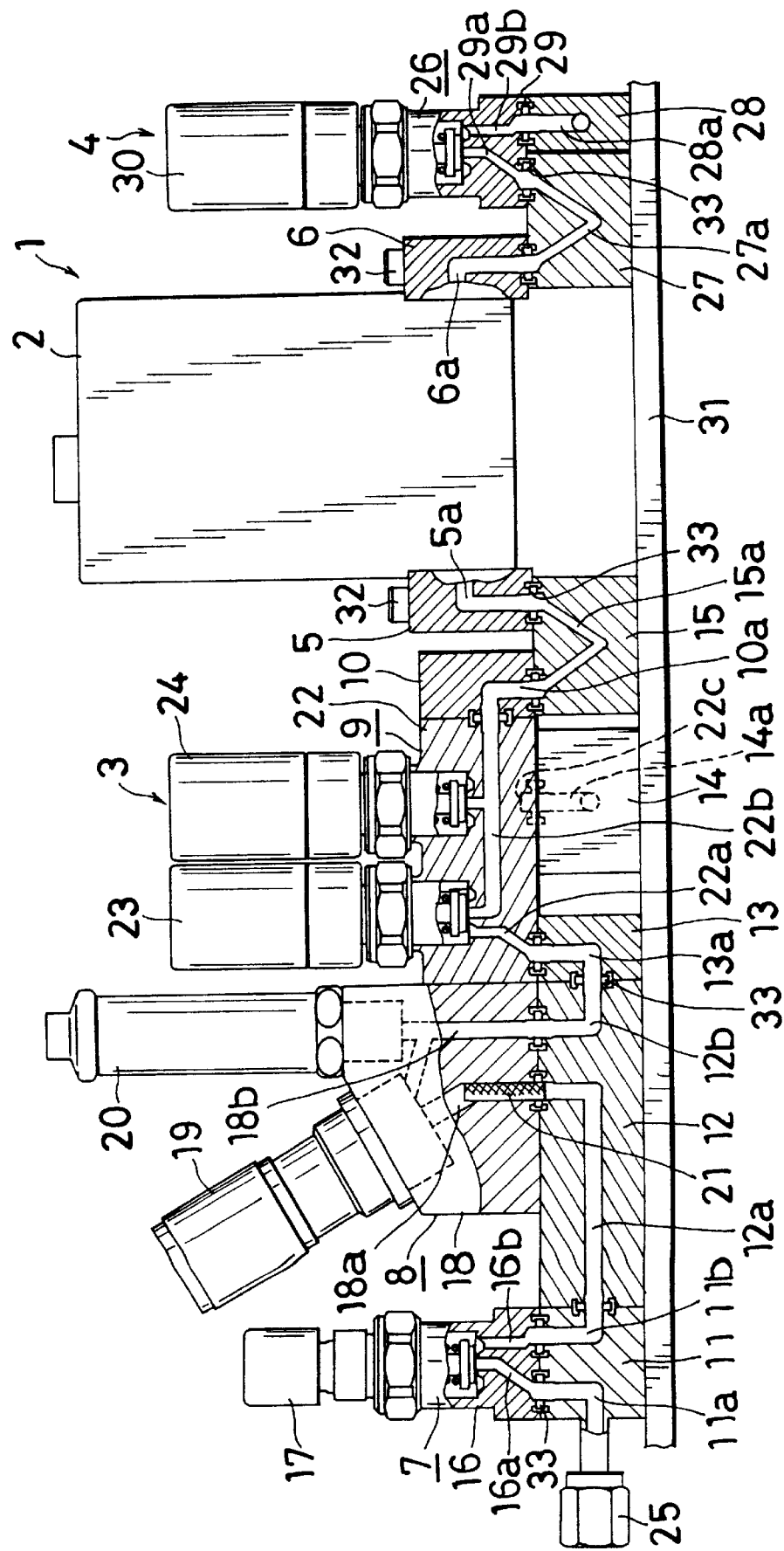
FIG. 1 is a side elevation showing a first embodiment of fluid control apparatus according to the invention.

Embodiments of the present invention will be described below with reference to the drawings. In the following description, the left-hand side and the right-hand side of FIG. 1 will be referred to as left and right, respectively. The front side of the plane of the drawing will be referred to as front, and the rear side thereof as rear.

Figure 2:
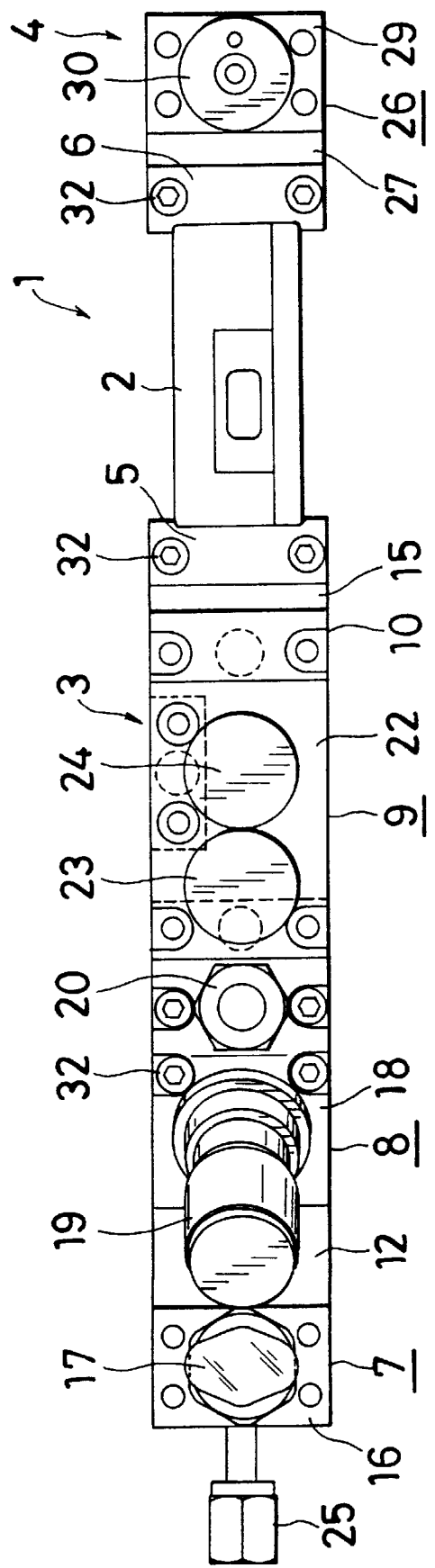
FIG. 2 is a plan view of the same.

FIGS. 1 and 2 show a fluid control apparatus 1 as a first embodiment of the invention. The apparatus 1, which is adapted for use in semiconductor manufacturing equipment or the like comprises a massflow controller 2, an inlet-side on-off-opening assembly 3 provided at the left of the controller 2, and an outlet-side shutoff-opening assembly 4 disposed at the right of the controller 2.

Provided on the left side of lower portion of the massflow controller 2 is a left extension block (first fluid control member) 5 in the form of a rectangular parallelepiped and formed with an inlet channel 5a which has an opening in the bottom surface of the block. Provided on the right side of the controller lower portion is a right extension block (second fluid control member) 6 in the form of a rectangular parallelepiped and formed with an outlet channel 6a which has an opening in the bottom surface of the block. The extension blocks 5, 6 are fastened to the body of the controller 2 with screws driven in laterally.

The inlet-side shutoff-opening assembly 3 comprises third to sixth four fluid control members 7, 8, 9, 10 arranged at an upper level, and first to fifth five rectangular parallelepipedal couplings 11, 12, 13, 14, 15 arranged at a lower level.

The third fluid control member 7, which is disposed at the left end of the assembly 3, comprises a first on-off valve 17 integral with a blocklike body 16 having an inlet channel 16a and an outlet channel 16b which extend downward, the valve 17 being operable to bring these channels 16a, 16b into and out of communication with each other.

The fourth fluid control member 8, which is the second component from the left end of the assembly 3, comprises a blocklike body 18 generally in the form of a rectangular parallelepiped, having a top left portion providing a slope and having an inlet channel 18a and an outlet channel 18b which extend downward; a pressure regulator 19 mounted on the slope of the body 18 and disposed at a portion of communication between the channels 18a, 18b for giving a regulated pressure; and a pressure sensor 20 mounted on a flat portion at the top left part of the body 18 for measuring fluid pressure through a channel communicating with the outlet channel 18b. The inlet channel 18a of the body 18 has a filter 21.

The fifth fluid control member 9, which is the third component from the left end of the assembly 3, comprises second and third on-off valves 23, 24 which are integral with one blocklike body 22 in the form of a rectangular parallelepiped. The body 22 has a downward first inlet channel 22a formed in its left end, a rightward outlet channel 22b communicating with the channel 22a through the second on-off valve 23, and a downward second inlet channel 22c communicating with the outlet channel 22b through the third on-off valve 24.

The sixth fluid control member 10, which is the fourth component from the left end of the assembly 3, comprises a rectangular parallelepipedal channel block. The member 10 is formed with a communication channel 10a having one end communicating with the outlet channel 22b of the fifth fluid control member 22 and the other end which is open downward.

The first coupling 11, which is disposed at the left end of the inlet-side shutoff-opening assembly 3, has an L-shaped upstream communication channel 11a opened leftward and communicating with the inlet channel 16a of the third fluid control member body 16, and an L-shaped downstream communication channel 11b opened rightward and communicating with the outlet channel 16b of the body 16. Provided on the left side of the first coupling 11 is a first inlet pipe joint 25 communicating with the upstream communication channel 11a.

The second coupling 12, which is disposed as the second from the left end of the assembly 3, has an L-shaped upstream communication channel 12a for holding the outlet channel 11b of the first coupling 11 in communication with the inlet channel 18a of the fourth fluid control member body 18, and an L-shaped downstream communication channel 12b having one end communicating with the outlet channel 18b of the body 18 and the other end opened rightward.

The third coupling 13, which is disposed as the third from the left end of the assembly 3, has an L-shaped communication channel 13a for holding the outlet channel 12b of the second coupling 12 in communication with the first inlet channel 22a of the fifth fluid control member body 22.

The fourth coupling 14, which is the fourth from the left end of the assembly 3, is formed with a communication channel 14a having one end communicating with the second inlet channel 22c of the fifth fluid control member body 22 and the other end opened rearward. Disposed on the rear side of the fourth coupling 14 is a second inlet pipe joint (not shown) communicating with the channel 14a.

The fifth coupling 15, which is the fifth from the left end of the assembly 3, is formed with a V-shaped communication channel 15a having one end communicating with the outlet of communication channel 10a of the sixth fluid control member 10 and the other end communicating with the inlet channel 5a of left extension block 5 of the massflow controller 2.

The outlet-side or downstream shutoff-opening assembly 4 comprises a seventh fluid control member 26 disposed at an upper level, and sixth and seventh rectangular parallelepipedal couplings 27, 28 which are arranged at a lower level. The seventh fluid control member 26 comprises a fourth on-off valve 30 integral with a blocklike body 29 having an inlet channel 29a and an outlet channel 29b which extend downward, the valve 30 being operable to bring these channels 29a, 29b into and out of communication with each other. The sixth coupling 27 disposed at the left side of the assembly 4 is formed with a V-shaped communication channel 27a having one end communicating with the outlet channel 6a of right extension block 6 of the massflow controller 2 and the other end communicating with the inlet channel 29a of the seventh fluid control member body 29. The seventh coupling 28 disposed at the right end of the assembly 4 is formed with a communication channel 28a having one end communicating with the outlet channel 29b of the body 29 and the other end opened rearward. Disposed on the rear side of the seventh coupling 28 is an outlet pipe joint (not shown) communicating with the channel 28a.

The bottom surfaces of the fluid control members 5, 6, 7, 8, 9, 10, 26 are all flush with one another. The upper surfaces of the couplings 11, 12, 13, 14, 15 are also flush with one another. The couplings 11, 12, 13, 14, 15, 27, 28 are fixed to a base plate 31. The fluid control members 5, 6, 7, 8, 9, 10, 26 are fixed to at least one of the couplings 11, 12, 13, 14, 15, 27, 28 with screws 32 from above.

Different fluids are introduced into the fluid control apparatus 1 respectively through the first inlet pipe joint 25 of the first coupling 11 and the second inlet pipe joint of the fourth coupling 14. These fluids as suitably changed over from one to the other are passed through the controller 2 and discharged from the outlet pipe joint of the seventh coupling 28.

With the fluid control apparatus 1, the massflow controller 2 can be taken out upward along with the left and right extension blocks 5, 6. The third to seventh fluid control members 7, 8, 9, 10, 26 can also be removed upward individually. For example, if there arises a need to replace the pressure regulator 19, the fourth fluid control member 8 is removed in its entirety, followed by the replacement of the regulator 19, and the resulting member 8 is entirely reinstalled in the original position. Further when a need arises to replace one of the second and third on-off valves 23, 24 included in the fifth fluid control member 9, the entire fifth member 9 is removed, followed by the replacement, and the resulting fifth member 9 is entirely reinstalled in position. A seal 33 is provided in each of the portions of communication between the fluid control members 5, 6, 7, 8, 9, 10, 26, the portions of communication between the couplings 11, 12, 13, 14, 15 and the portions of communication between the fluid control members 5, 6, 7, 8, 9, 10, 26 and the couplings 11, 12, 13, 14, 15. The fluid control apparatus 1 according to the first embodiment has the seal 33 at each of 13 locations.

The inlet-side and outlet-side shutoff-opening assemblies 3, 4 of the above embodiment are not limitative. It is possible, for example, to remove the fourth fluid control member 8 from the inlet-side assembly 3, to add the same member as the fifth fluid control member 9 of the assembly 3 to the outlet-side assembly 4, or to provide the same member in place of the seventh fluid control member 26. The pressure regulator 19 and the pressure sensor 20 are fixed to the blocklike body 18 of the fourth fluid control member 8 by welding or screw-thread engagement.

Figure 3:
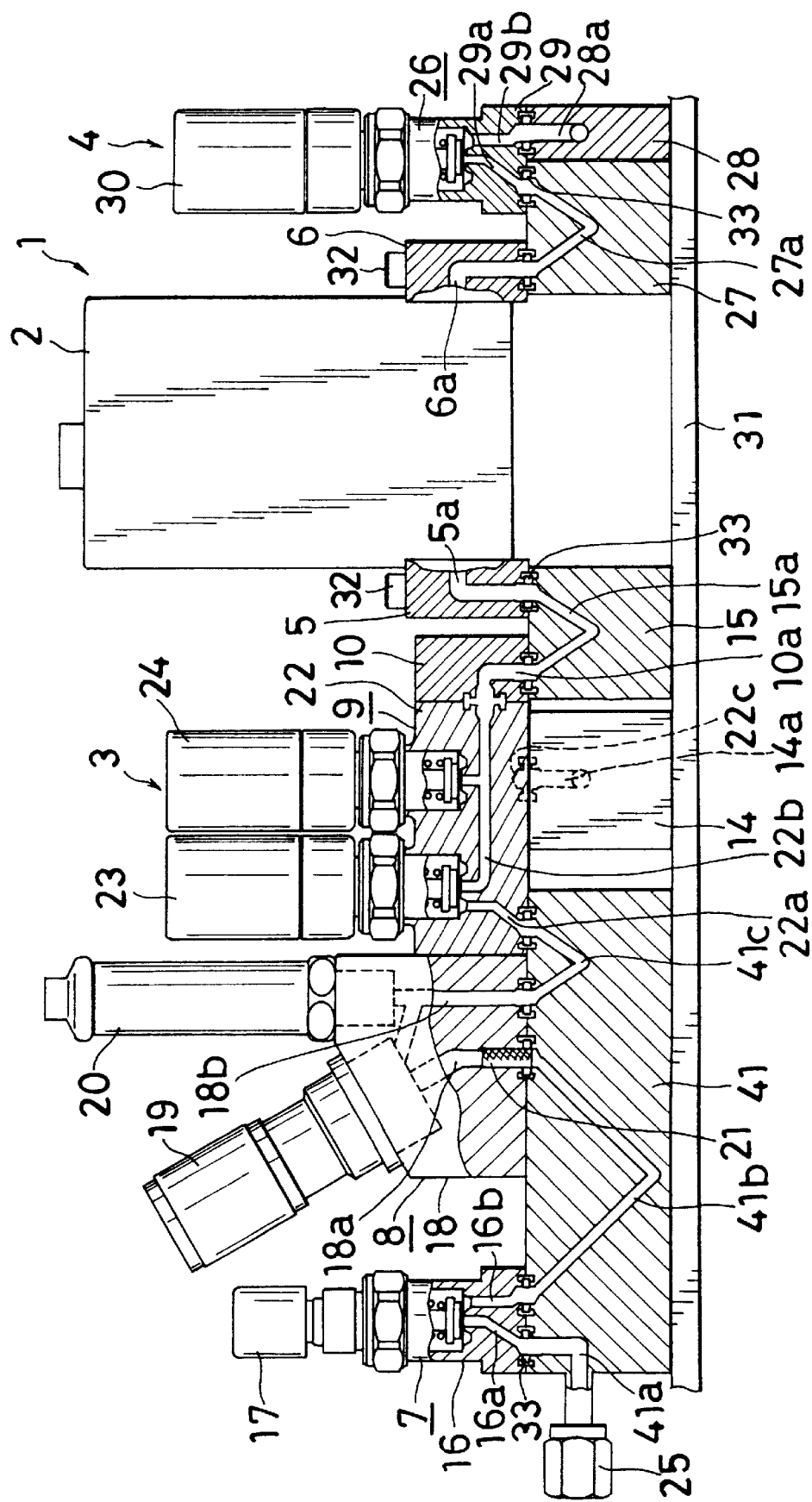
FIG. 3 is a side elevation showing a second embodiment of fluid control apparatus according to the invention.

FIG. 3 shows another fluid control apparatus as a second embodiment of the invention. The second embodiment differs from the first in that the first, second and third couplings 11, 12, 13 of the first embodiment is replaced by a single rectangular parallelepipedal coupling (eighth coupling) 41. With reference to the drawing, the eighth coupling 41 is formed with an upstream communication channel 41a having one end communicating with the inlet channel 16a of the third fluid control member body 16 and the other end opened leftward, a first V-shaped communication channel 41b having one end communicating with the outlet channel 16b of the body 16 and the other end communicating with the inlet channel 18a of the fourth fluid control member body 18, and a second V-shaped communication channel 41c having one end communicating with the outlet channel 18b of the body 18 and the other end communicating with the first inlet channel 22a of the fifth fluid control member body 22. Provided on the left side of the eighth coupling 41 is the first inlet pipe joint 25 communicating with the upstream communication channel 41a. To give a suitable diameter to the channel 41b which is elongated in the left-to-right direction, the eighth coupling 41 has a greater height than the first, second and third couplings 11, 12, 13 of the first embodiment, and the channel 41b has a greater depth than the second V-shaped communication channel 41c. In conformity with this feature, the fourth, fifth, sixth and seventh couplings 14, 15, 27, 28 are given the same height as the eighth coupling 41, with their communication channels 14a, 15a, 27a, 28a remaining unaltered in depth. The second embodiment has the same construction as the first with the exception of the above features, and like parts are designated by like reference numerals or symbols and will not be described repeatedly.

The second embodiment is smaller than the first by two in the number of seals 33 and by two also in the number of couplings.

Figure 4:
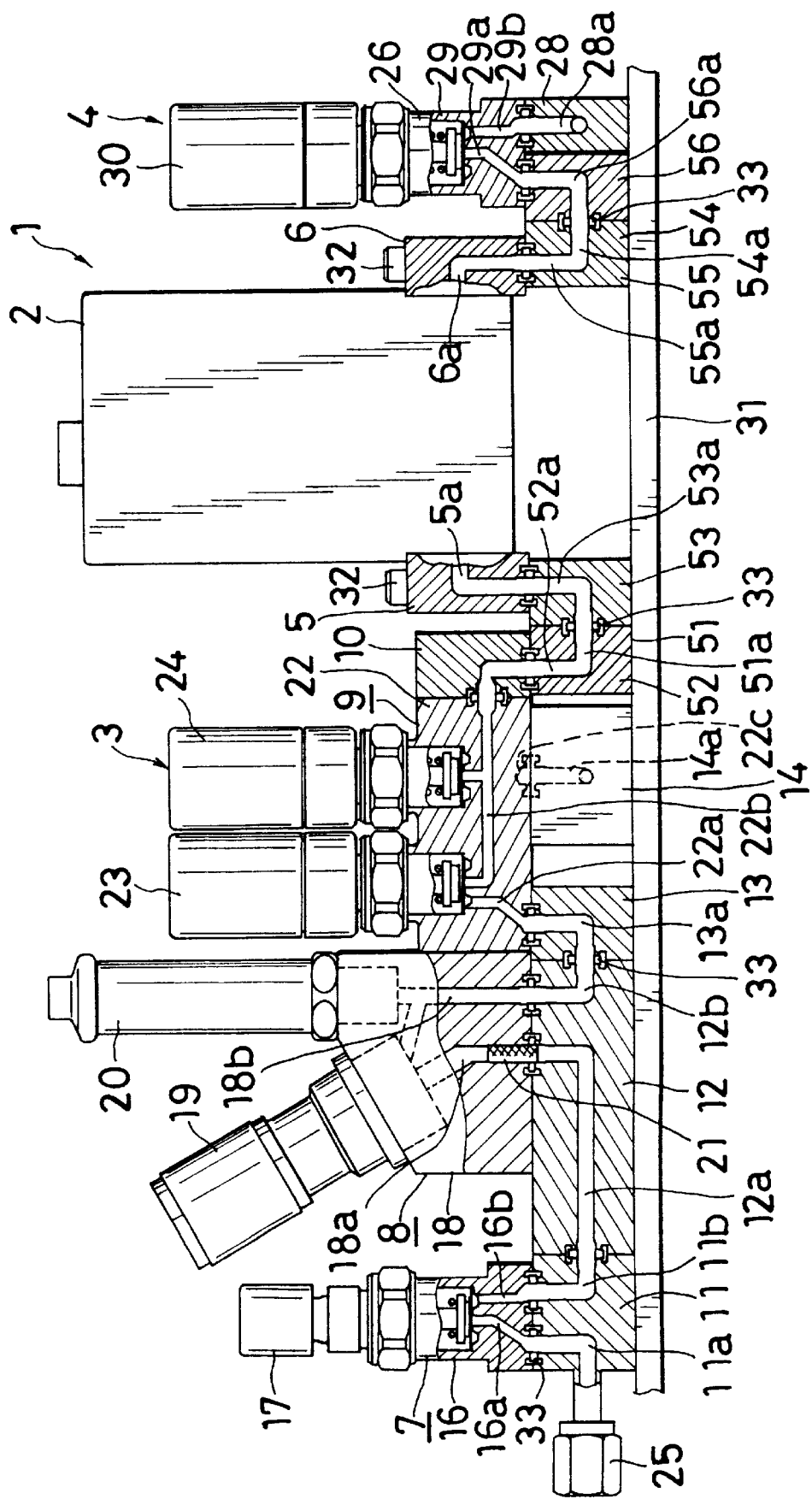
FIG. 4 is a side elevation showing a third embodiment of fluid control apparatus according to the invention.

FIG. 4 shows another fluid control apparatus as a third embodiment of the invention. The third embodiment differs from the first in that the fifth and sixth couplings 15, 27 of the first embodiment, i.e., the couplings 15, 27 having the respective V-shaped communication channels 15a, 27a, are replaced respectively by couplings (ninth and tenth couplings) 51, 54 each comprising two rectangular parallelepipedal components and having a U-shaped communication channel. With reference to the drawing, the ninth coupling 51 comprises a first component 52 and a second component 53. The first component 52 is formed with an L-shaped upstream communication channel 52a having one end communicating with the outlet of communication channel 10a of the sixth fluid control member body 10 and the other end opened rightward. The second component 53 is formed with an L-shaped downstream communication channel 53a having one end communicating with the upstream communication channel 52a of the first component 52 and the other end communicating with the inlet channel 5a of left extension block 5 of the massflow controller 2. The first and second components 52, 53 are fitted to each other with a seal 33 interposed therebetween so as to cause the upstream channel 52a to communicate with the downstream channel 53a, whereby a U-shaped communication channel 51a is formed in the ninth coupling 51 for holding the channel 10a of the sixth fluid control member body 10 in communication with the inlet channel 5a of left extension block 5 of the massflow controller 2. Similarly, the tenth coupling 54 comprises a first component 55 and a second component 56. The first component 55 is formed with an L-shaped upstream communication channel 55a having one end communicating with the outlet channel 6a of right extension block 6 of the massflow controller 2 and the other end opened rightward. The second component 56 is formed with an L-shaped downstream communication channel 56a having one end communicating with the upstream communication channel 55a of the first component 55 and the other end communicating with the inlet channel 29a of the seventh fluid control member body 29. The first and second components 55, 56 are fitted to each other with a seal 33 interposed therebetween so as to cause the upstream channel 55a to communicate with the downstream channel 56a, whereby a U-shaped communication channel 54a is formed in the tenth coupling 54 for holding the outlet channel 6a of right extension block 6 of the massflow controller 2 in communication with the inlet channel 29a of the seventh fluid control member body 29. With the exception of the above feature, the third embodiment has the same construction as the first, and like parts are designated by like reference numerals or symbols and will not be described repeatedly.

What is claimed is:

1. A fluid control apparatus consisting of:
   a plurality of fluid control members arranged at an upper level each having,
      a blocklike body with an upper side and a lower side, the lower side of each of the plurality of control members being in the same plane with each other;
      at least one cavity in the upper side of the blocklike body for fitting integrally therein at least one monofunctional member for controlling fluid,
      at least one fluid channel formed between the monofunctional member for controlling fluid and the bottom side of the blocklike body;
   a plurality of couplings arranged below the plurality of fluid control members at a lower level each having,
      a blocklike body, having an upper surface, mounted to the bottom surface of at least one fluid control member, the upper surface of each of the blocklike bodies being in the same plane with each other;
      at least one communication channel for fluids communicating between at least two fluid channels of at least two different monofunctional members;
   a seal provided between fluid channels and communication channels of the fluid control apparatus; and
   a base plate for supporting a plurality of couplings fixed thereon,
   wherein said at least one cavity makes said at least one monofunctional member integral with said at least one fluid control member and thereby said fluid control apparatus has reduced pressure losses and a capacity for being used upside down or on a side, and
   said blocklike body of each of said plurality of fluid control members being mounted on at least one of the plurality of couplings so as to be upwardly removable.

2. A fluid control apparatus according to claim 1 wherein at least one of the couplings which causes one of the fluid control members to communicate with the fluid control member adjacent thereto is a blocklike coupling having a V-shaped communication channel.

3. A fluid control apparatus according to claim 1 wherein at least one of the couplings which causes one of the fluid control members to communicate with the fluid control member adjacent thereto comprises two blocklike components butting against each other to form a U-shaped communication channel.

4. A fluid control apparatus according to claim 1 wherein the plurality of monofunctional members are all on-off valves.

5. A fluid control apparatus according to claim 1 wherein the plurality of monofunctional members are a pressure regulator and a pressure sensor.

* * * * *